United States Patent
Pierre

(10) Patent No.: US 10,241,365 B2
(45) Date of Patent: Mar. 26, 2019

(54) BACKLIGHTING DEVICE, PARTICULARLY FOR HEAD-UP DISPLAY, AND HEAD-UP DISPLAY FOR MOTOR VEHICLE

(71) Applicant: VALEO COMFORT AND DRIVING ASSISTANCE, Créteil (FR)

(72) Inventor: Lenaic Pierre, Creteil (FR)

(73) Assignee: VALEO COMFORT AND DRIVING ASSISTANCE, Créteil (FR)

(*) Notice: Subject to any disclaimer, the term of this patent is extended or adjusted under 35 U.S.C. 154(b) by 0 days.

(21) Appl. No.: 15/528,229

(22) PCT Filed: Nov. 27, 2015

(86) PCT No.: PCT/FR2015/053253
§ 371 (c)(1),
(2) Date: May 19, 2017

(87) PCT Pub. No.: WO2016/083763
PCT Pub. Date: Jun. 2, 2016

(65) Prior Publication Data
US 2017/0329181 A1    Nov. 16, 2017

(30) Foreign Application Priority Data
Nov. 28, 2014 (FR) .................................. 14 02716

(51) Int. Cl.
*G02F 1/1335* (2006.01)
*G02B 27/01* (2006.01)
(Continued)

(52) U.S. Cl.
CPC ... *G02F 1/133603* (2013.01); *G02B 19/0014* (2013.01); *G02B 19/0066* (2013.01);
(Continued)

(58) Field of Classification Search
CPC ...... G02F 2001/133628; H01L 33/64–33/648; F21V 29/83; G02B 27/01; G02B 27/0101
See application file for complete search history.

(56) References Cited

U.S. PATENT DOCUMENTS 5,771,966 A * 6/1998 Jacoby ................ H01L 21/4882
361/704
5,791,770 A    8/1998 Hoyt et al.
(Continued)

FOREIGN PATENT DOCUMENTS

| EP | 2 690 484 A1 | 1/2014 | |
|---|---|---|---|
| JP | 2008059965 A * | 3/2008 | |
| JP | 2015118272 A * | 6/2015 | ......... G02F 1/13439 |

OTHER PUBLICATIONS

International Search Report issued in PCT/FR2015/053253 dated Jan. 29, 2016 (2 pages).
(Continued)

*Primary Examiner* — Mariceli Santiago
(74) *Attorney, Agent, or Firm* — Osha Liang LLP

(57) ABSTRACT

The invention relates to a backlighting device (14), particularly for head-up display. Said device includes:
  at least one light-emitting diode (16), emitting light beams;
  an optical system (20) for shaping light beams; and
  a light diffuser (22), receiving the shaped light beams and said diffuser also comprises a heat sink (18) formed of at least two parts including a base plate (50) and at least one strip (52) that is attached onto said base plate. The strip comprises at least one fold (90) for forming at least one cooling fin (80) and at least one area (60) intended for thermal contact with said base plate (50).

18 Claims, 4 Drawing Sheets

Figure 1:
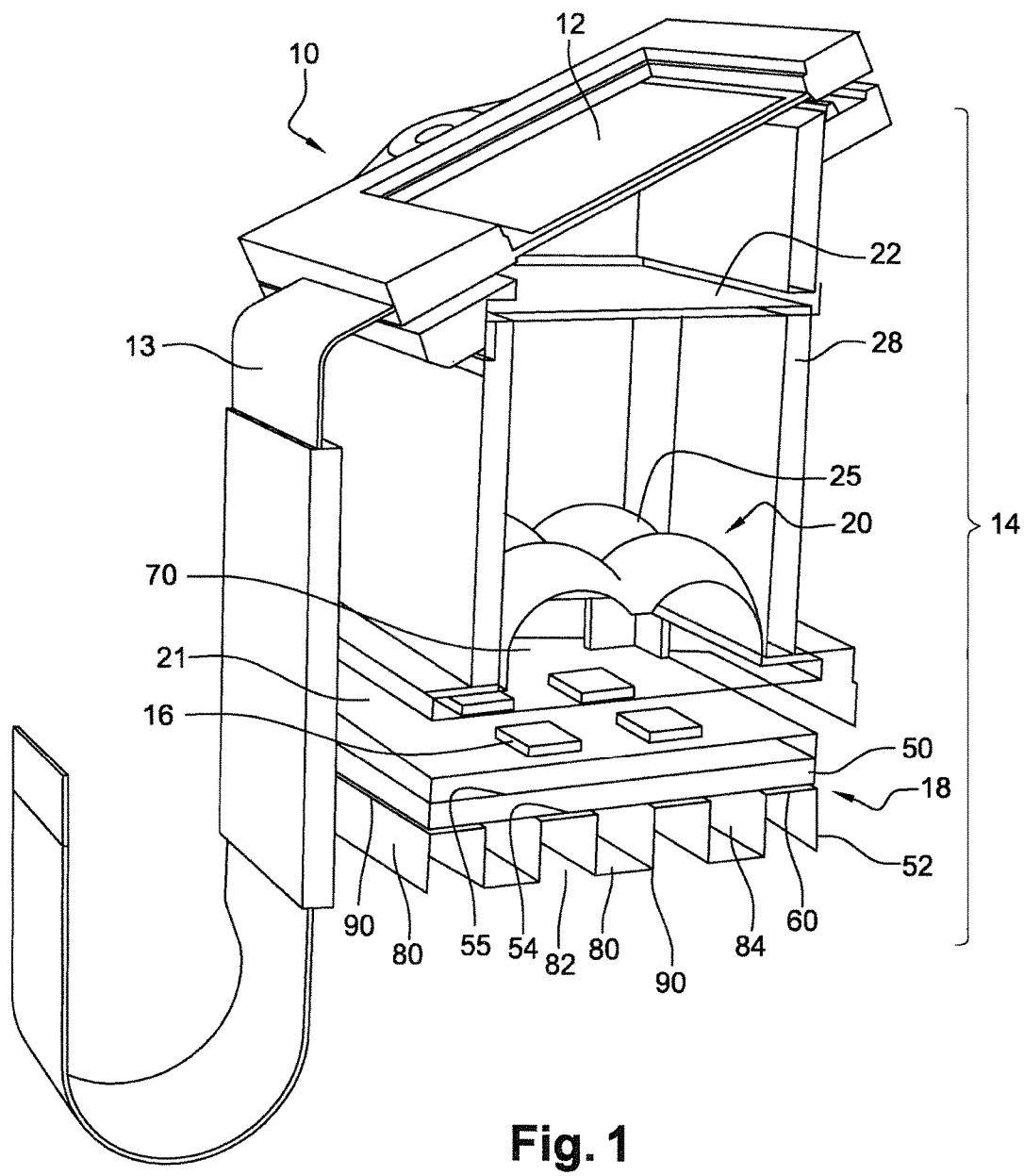

(51) Int. Cl.
*G02B 19/00* (2006.01)
*G02F 1/1368* (2006.01)

(52) U.S. Cl.
CPC .......... *G02B 27/0101* (2013.01); *G02B 27/01* (2013.01); *G02F 1/1368* (2013.01); *G02F 2001/133628* (2013.01)

(56) References Cited

U.S. PATENT DOCUMENTS

| | | | |
|---|---|---|---|
| 9,081,179 B2* | 7/2015 | Matsuura | G02B 27/0101 |
| 2007/0064174 A1* | 3/2007 | Kitamura | G02F 1/133603 |
| | | | 349/69 |
| 2009/0027589 A1* | 1/2009 | Yamazoe | G02B 27/0101 |
| | | | 349/62 |
| 2010/0240158 A1* | 9/2010 | Ter-Hovhannissian | ...................... |
| | | | F21V 29/74 |
| | | | 438/27 |
| 2011/0317273 A1* | 12/2011 | Kasai | B60K 35/00 |
| | | | 359/630 |
| 2015/0123879 A1* | 5/2015 | Aboshi | G02B 5/3025 |
| | | | 345/7 |
| 2017/0117451 A1* | 4/2017 | Matsumoto | H01L 33/642 |

OTHER PUBLICATIONS

Written Opinion of the International Searching Authority issued in PCT/FR2015/053253 dated Jan. 29, 2016 (5 pages).

\* cited by examiner

BACKLIGHTING DEVICE, PARTICULARLY FOR HEAD-UP DISPLAY, AND HEAD-UP DISPLAY FOR MOTOR VEHICLE

TECHNICAL FIELD OF THE INVENTION

The invention relates to a backlighting device, notably for head-up displays for motor vehicles.

PRIOR ART

The invention will be applicable, for example, to motor vehicles, for providing information to users of vehicles, particularly their drivers.

There is a known way of equipping a motor vehicle with a head-up viewer, also known as a head-up display or HUD (for "head-up display" in English). Such a display is placed in the field of view of the motor vehicle driver and displays information relating to the state of the vehicle or of the traffic, or other information.

This type of head-up display for motor vehicles requires the production of an image with sufficient brightness to enable the user, and notably the driver of the vehicle, to have a sufficient view of the image in all situations, in daytime, at night, and in different meteorological conditions (sunshine or cloud).

Among the possible technologies for forming such an image by means of a head-up display, the most widely used in the prior art is liquid crystal screen technology, notably thin-film transistor liquid crystal screen technology, known as TFT-LCD (for Thin-Film Transistor Liquid Crystal Display in English). To display an image, these TFT-LCD screens require backlighting, which is usually provided by a plurality of light-emitting diodes (DEL in French, or LED for Light-Emitting Diode in English). In practice, this TFT-LCD screen and the backlighting are included in an assembly called an image generation device, or "imager".

However, since their operation is based on polarized light, these TFT-LCD screens have the drawback of considerably reducing the light output provided by the backlighting: when a conventional TFT-LCD screen is used it is estimated that the transmission rate of the screen is approximately 5% of the light output of the backlighting. This low value is, notably, due to the first polarizer in the screen, which only allows the passage of light corresponding to a certain polarization, whereas LEDs produce light with a plurality of polarizations: thus all polarizations not corresponding to that which the polarizer allows to pass are lost.

Consequently, to enable an image to be shown by the display with sufficient light output, backlighting with a high light output must be used, since the displayed image will have a light output of about 5% of this backlighting output. This leads to high energy consumption, as well as considerable losses in the form of heat, which may also damage the components, making it necessary to use bulky heat sinks.

OBJECTS OF THE INVENTION

The invention is intended to overcome at least some of the above drawbacks.

In particular, the invention is intended to provide a backlighting device with a high optical efficiency, combined with smaller overall dimensions.

SUMMARY OF THE INVENTION

For this purpose, the invention proposes a backlighting device, notably for a head-up display, comprising:

at least one light-emitting diode which emits light beams, an optical system for shaping the light beams, and a light diffuser receiving the shaped light beams, it further comprises a heat sink made in at least two parts, comprising, on the one hand, a base plate, and, on the other hand, at least one strip fastened to said base plate, the strip comprising at least one bend to form at least one cooling fin and at least one area designed to come into thermal contact with said base plate.

Fins made of bent sheet metal, also called bent strip, have better thermal efficiency than fins made by molding. Since the heat generated by the diodes is efficiently dissipated by the two-part heat sink, the shaping optical system may be placed closer to the diodes, notably about 0.5 mm from them. Thus the height and size of the backlighting device may be reduced, resulting in smaller overall dimensions of the head-up display (HUD) as a whole. The latter point is very important in relation to the dashboard in which the display is to be integrated, where each millimeter of overall dimensions saved is very important. The optical efficiency of the device may also be increased by placing the shaping optical system more closely, since the lateral losses of the light cone are reduced. Thus, because of the invention, it is possible to provide a head-up display to be arranged within smaller overall dimensions without degrading the optical performance.

The backlighting device may also have one or more of the following characteristics, considered individually or in combination:

The strip has a plurality of bends and a plurality of areas in contact with the base plate.
The strip has a castellated shape.
A heat-conducting paste is interposed between the base plate and at least one contact area of the strip.
The strip is fastened to the base plate by welding, screwing or crimping.
The strip and/or the base plate are made of aluminum.
The strip is placed on a lower face of the base plate, opposite an upper face of the base plate carrying the light-emitting diodes.
On its face opposite the face carrying the light-emitting diodes, the base plate of the heat sink comprises grooves which house the fins.
The grooves have a curved or flat cross section, and the contact areas of the cooling fins are made in the form of a bent strip, the return bends being housed and fastened in grooves having a curved or flat cross section.
The strip is placed in line with the light-emitting diodes.
The strip is offset relative to the location of the light-emitting diodes and is positioned on an extension of the base plate.
The extension of the base plate has a different orientation from the part of the base plate placed in line with the light-emitting diodes.
The base plate has a bend, so that the extension of the base plate may have a different orientation from the part of the base plate placed in line with the light-emitting diodes.
The shaping optical system comprises a grid of lenses, each lens being placed facing a light-emitting diode and forming a collimator.

The invention also relates to an image generation device, notably for a heads-up display, comprising a liquid crystal screen and a backlighting device of this liquid crystal screen as defined above.

The invention also relates to a head-up display comprising an image generation device as defined above.

The head-up display comprises, for example, at least one reflecting mirror.

According to one aspect, the image generation device is held in a head-up display housing and the heat sink projects outside the head-up display housing.

This further improves the dissipation of the heat produced by the light-emitting diodes.

Figure 2:
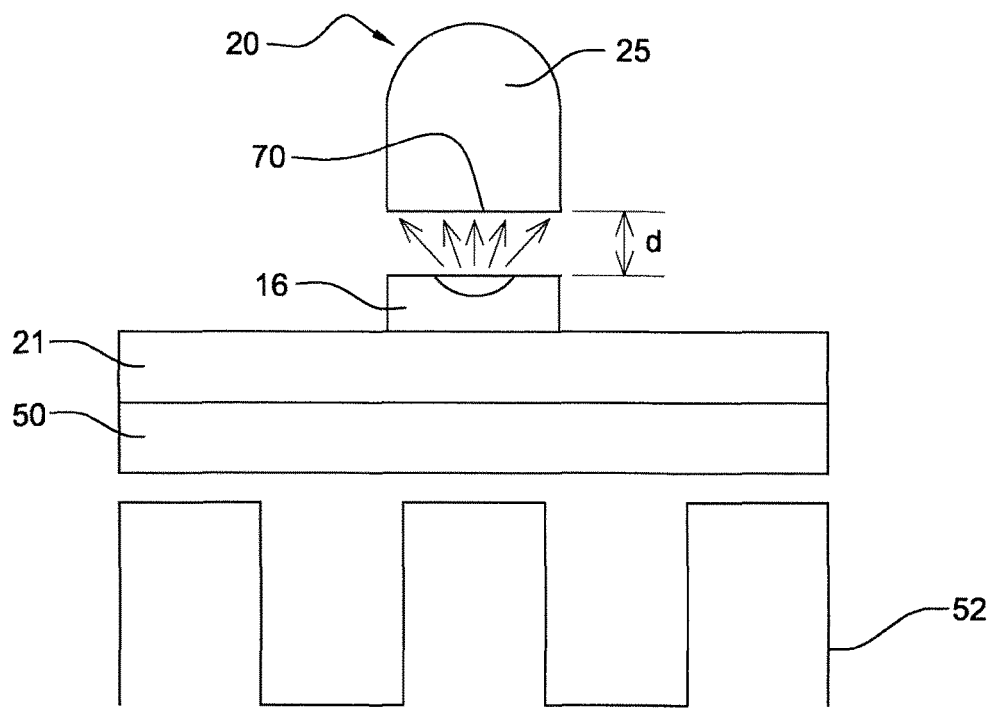
Figure 3:
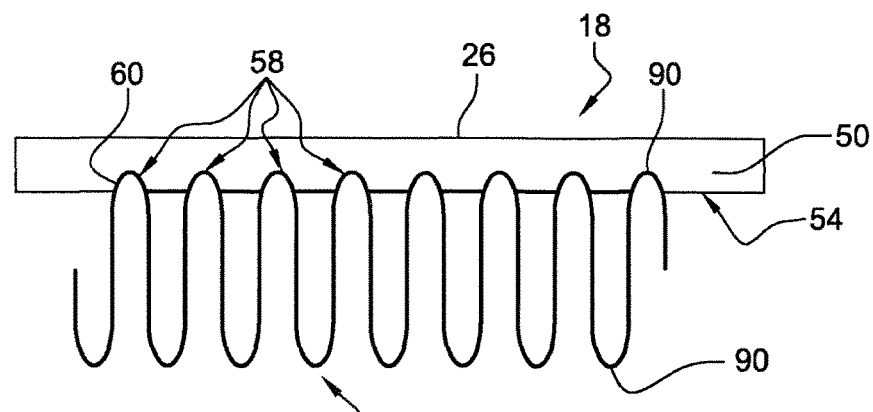
Figure 4:
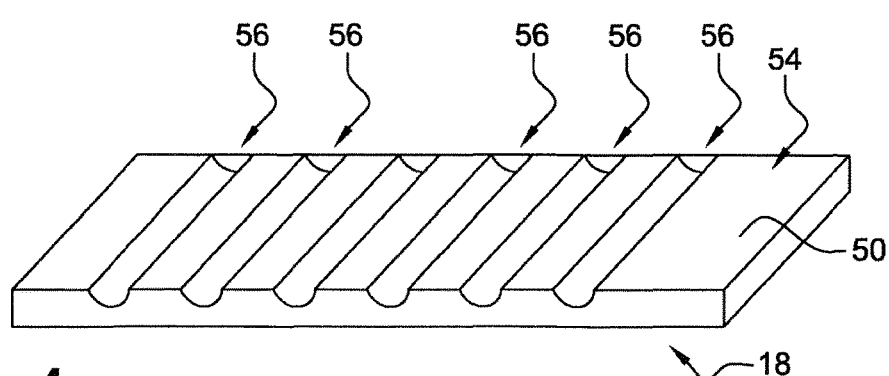
Figure 5:
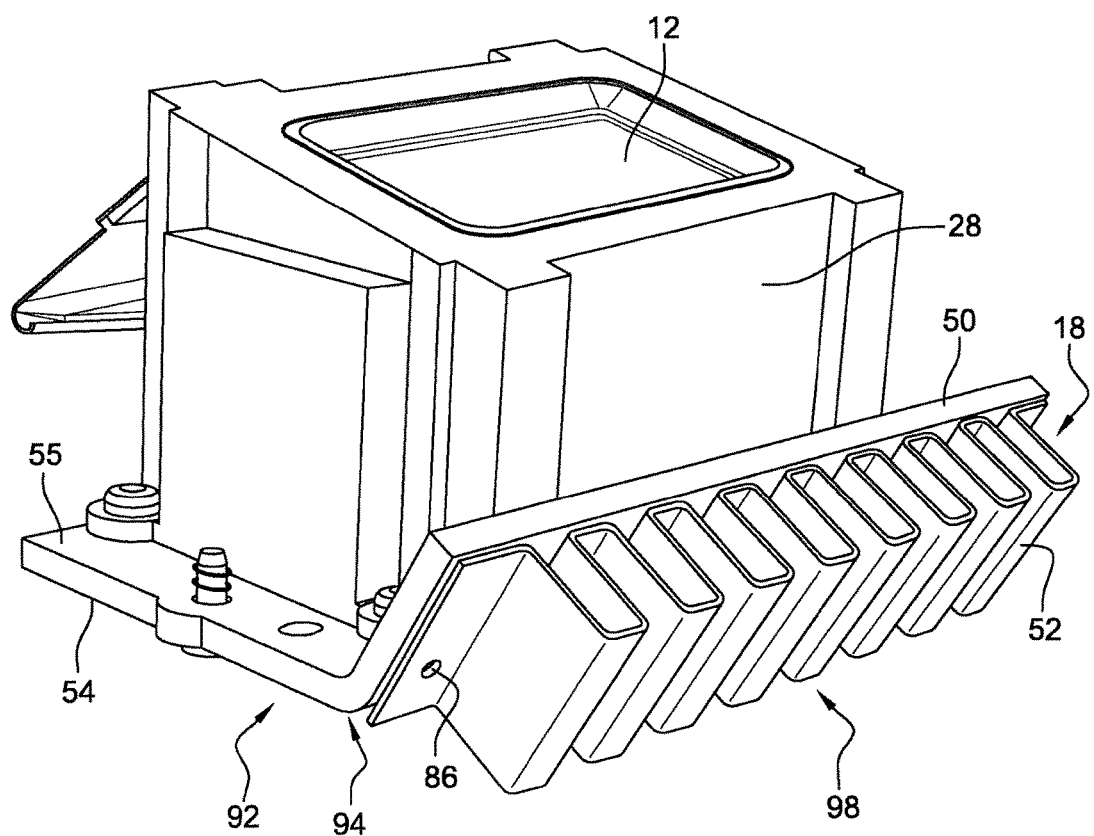
Figure 6:
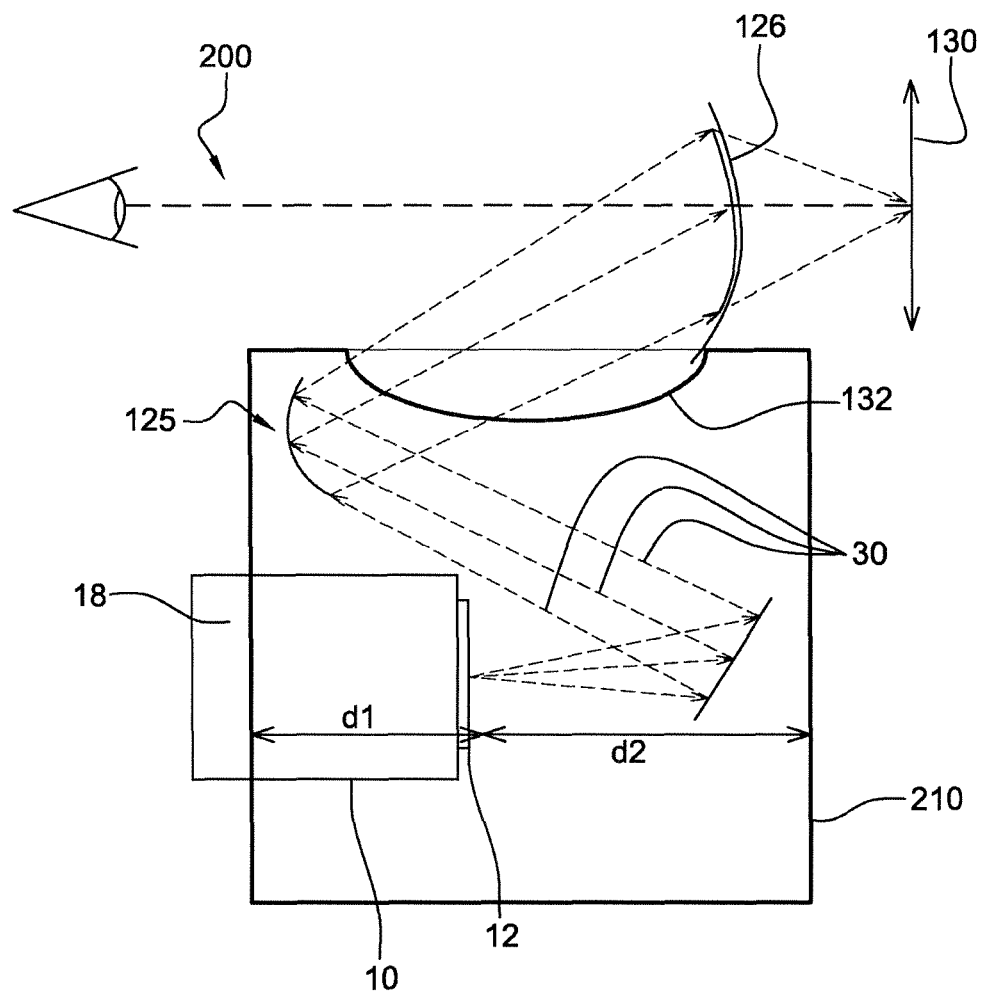

Other advantages and characteristics will be apparent from a perusal of the description of the invention and the attached drawings, in which:

FIG. 1 is a schematic sectional perspective view of an embodiment of a device according to the invention, FIG. 2 is a schematic sectional view of a detail of the device according to the invention, FIG. 3 is a schematic side view of an exemplary embodiment of the heat sink, FIG. 4 is a schematic perspective view of the lower face of a base plate of a heat sink, FIG. 5 is a perspective view of an embodiment of a device according to the invention, FIG. 6 is a schematic view of an image generation device and a head-up display according to the invention.

In these drawings, identical elements are given the same reference numerals.

An exemplary embodiment will now be described with reference to the drawings.

The following embodiments are examples. Although the description refers to one or more embodiments, this does not necessarily mean that each reference concerns the same embodiment, or that the characteristics are applicable to a single embodiment only. Simple characteristics of different embodiments may also be combined to provide other embodiments.

FIG. 1 shows a schematic view of a section through an image generation device 10 according to an embodiment of the invention.

The image generation device 10 comprises a liquid crystal screen, in this case a liquid crystal screen 12 (LCD screen), using thin-film transistors for example, and a backlighting device 14. The liquid crystal screen 12 may be of the active or passive matrix type. The thin-film transistor liquid crystal screen 12 is commonly called a TFT-LCD (for Thin-Film Transistor Liquid Crystal Display in English) screen, and enables the image to be formed by the image generation device 10. The screen 12 is, for example, connected by a multi-conductor flat cable or a flexible circuit 13 to an electronic control system.

The backlighting device 14 serves to provide the screen 12 with the necessary light to form the image. For this purpose, the backlighting device 14 comprises:
- a plurality of light-emitting diodes 16 (also called DELs in French, or LEDs, for "Light Emitting Diode", in English, which will be used in the rest of the description), which emit light beams,
- an optical system 20 for shaping the light beams,
- a light diffuser 22 receiving the shaped light beams.

The device 14 further comprises a heat sink 18 comprising at least two parts, namely a flat base plate 50 on its lower face 54 on the one hand, and a strip 52 bent into a castellated shape, flat parts 60 forming contact areas being fastened directly against the lower face 54 of the base plate 50, by bonding or welding for example. To provide good heat exchange, a heat-conducting paste with high thermal conductivity is interposed between the base plate 50 and the strip 52. According to another non-limiting exemplary embodiment of the invention, the strip may also be held by crimping on the base plate 50. According to other embodiments, the contact areas 60 are not necessarily flat, but may be rounded, as shown in FIG. 3 for example.

The strip 52 with multiple bends forms cooling fins 80. The castellated shape of the strip allows the cooling fluid to move in a natural convection motion along the fins 80 forming channels which are open to the outside 82 or closed 84, these closed channels obviously being open at both ends.

By way of non-limiting example, to obtain a high level of thermal conductivity and/or heat exchange with the cooling fluid, the base plate 50 and/or the strip 52 are made of aluminum.

The strip may be made in one piece. It may also be made in more than one piece, each piece, for example, being shaped as a letter L, one segment of which is fixed to the base plate while the other forms a cooling fin. In the context of this invention, any shape of strip is feasible, and the shape is not limited to the examples described herein.

In the case of natural convection, the shape and orientation of the fins will be determined so as to promote this convection as much as possible. The same applies in the case of forced convection.

The upper face 55 of the base plate 50 carries a power supply circuit 21 for the light sources 16. This power supply circuit 21 may be a printed circuit, also called a PCB (for Printed Circuit Board in English). The printed circuit used may be, for example, of the type known as FR4 (for Flame Resistant 4 in English) or IMS (for Insulated Metal Substrate in English). A heat-conducting paste with very high thermal conductivity is applied between the power supply circuit and the upper face 55 of the base plate.

The heat sink 18 comprises a base plate 50 acting as a radiator and cooling fins 80, positioned on the face 54 opposite the face carrying the printed circuit and oriented perpendicularly to the base plate 50.

The LEDs 16 are, for example, power LEDs, notably with a power greater than or equal to 3 W, placed so as to emit light toward the screen 12. The screen 12 is inclined at a predefined angle, preferably between 0° and 40°, in order to provide a vertical virtual image when the image generation device is used in a head-up display.

The shaping optical system 20 comprises, for example, a grid of lenses 25, for collimating the light from the LEDs 16 to limit the losses of light output if some of the light is not guided toward the screen 12. The grid of lenses usually comprises one lens 25 per LED 16, each lens 25 being positioned above each LED 16.

The diffuser 22 may be used to homogenize the light, so as to illuminate the screen 12 in a homogeneous manner to allow the formation of a high-quality image, that is to say an image of substantially uniform brightness. Additionally, the diffuser 22 may be used to mask the interior of the backlighting device.

Other optical systems may also be placed between the diffuser 22 and the screen 12, for example crossed prismatic filters or polarization films.

Because of the use of a two-part heat sink according to the invention, the heat produced by the diodes 16 is more efficiently dissipated, so that the shaping optical system 20 may be positioned closer to the LEDs 16. In practice, the distance d between the lower face 70 of the lens 25 and the LED 16 to a value between 0.3 and 0.7 mm, typically about 0.5 mm (see FIG. 2).

This also makes it possible to reduce the height and size of the backlighting device, resulting in smaller overall dimensions of a head-up display (HUD) as a whole, notably for the same light output of the backlighting device 10.

The latter point is very important in relation to the space under the dashboard in which the head-up display is to be integrated, where each millimeter saved is very important. The optical efficiency of the device may also be increased by the fact that the shaping optical system 20 is placed more closely, since the lateral losses of the light beam cone emitted by the LEDs 16 are reduced.

To ensure that the light propagated from the LEDs 16 toward the screen 12 remains within the backlighting device 14, the space contained between the LEDs 16 and the screen 12 is surrounded by a housing 28, which is commonly called a "light box", notably in the motor vehicle field. To avoid losses of light output in the housing 28 due to light absorption, the housing is made of a reflective material based on polycarbonate (abbreviated to PC). To provide optimal light reflection, the housing 28 must have a very smooth polished surface.

According to a variant which is not shown, the printed circuit may also be covered with a reflective film, except at the location of the LEDs 16. This reflective film may be a film of polycarbonate (PC) having a reflection coefficient of more than 90%, or preferably greater than or equal to 98%. Other materials may be feasibly used for the reflective film, provided that they meet the other constraints of the device 10.

In a variant, as shown in FIGS. 3 and 4, the base plate 50 of the heat sink 18 has, on its face 54 for example, grooves 56 having a curved cross section, in the form of channels, and the cooling fins 80 are made in the form of a bent strip, the return bends 58 being housed and fastened in the grooves 56. In a variant, these grooves may be flat, to receive a strip 52 of castellated shape as described above.

The thermal conductivity of non-molded aluminum is practically twice that of molded aluminum. With this embodiment, the heat dissipation is significantly improved with a device of equivalent size. In a variant, this makes it possible to reduce the size of the heat sink and therefore of the backlighting device as a whole. This better heat dissipation enables the temperature at the light-emitting diodes to be reduced, thus also increasing the life of these diodes.

The curved part of the groove enables the contact surface with the bends of the strip to be increased, thus also providing better heat dissipation.

FIG. 5 shows a variant embodiment of the device according to the invention in which the base plate 50 is bent in an elbow or bend 94 so that the lower face 54 of the base plate has two planes with different orientations. By way of example, a first plane 92 is in line with the housing 28 containing the printed circuit 21 and the LEDs 16 to be cooled. In this case, the lower face 54 of the base plate 50 does not carry a cooling strip on this plane 92. This situation may occur, for example, if there is no room available to place the cooling strip in this position. Another reason is that it is desirable to arrange the strip in another orientation, for example in order to provide better natural convection by orienting the fins 80 so that the hot air can easily move upward with the minimum of constraints. Thus, in the embodiment of FIG. 5, the strip is placed on a lower face 54 of the base plate 50 which is oriented in a plane 98 which is different from the plane 92 described above. The base plate 50 is extended with respect to the housing 28, and notably with respect to the location of the LEDs 16, so as to form a cantilever on which the strip is placed, this cantilever being in this case oriented in a different plane from that on which the housing 28 is supported.

A hole 86 allows the passage of a screw for fastening the strip.

In a variant, for reasons concerned with the overall dimensions for example, the base plate 50 may have a simple cantilever, that is to say one without a bend 94 in the base plate 50. In this case, the two planes 92 and 98 described above are merged.

As shown in FIG. 6, the invention also relates to a head-up display 200 comprising an image generation device 10 according to the invention.

The image generation device 10 described with reference to FIG. 1 forms an image by means of the liquid crystal screen 12.

Downstream of the screen 12 in the direction of movement of the light beam, said display 200 comprises at least one semi-reflective optical element 126 and a reflection device 125 interposed on the path of the image between the screen 12 and the semi-reflective blade 126, the reflection device 125 comprising one or more flat or concave mirror, as shown in FIG. 6. In this figure, the path of the image is indicated by three arrows 30 in dotted lines, which are reflected from the reflection device 125 before being displayed via the semi-reflective blade 126. The latter enables the image to be magnified and/or displayed, by transparency, beyond the semi-reflective blade, notably beyond the windshield of the equipped vehicle, on a virtual screen 130, provided by means of the semi-reflective blade 126.

This blade 126 has a reflectivity of at least 20%, enabling the user to see the route taken by the vehicle through the blade, while benefiting from enhanced contrast allowing the displayed image to be viewed. Alternatively, the display of the image may take place at the level of the windshield of the vehicle equipped with said display device 200.

As shown in FIG. 6, the image generation device 10 is held in a head-up display housing 210, and the heat sink 18 of the backlighting device 10 projects outside the head-up display housing 210, thereby further improving the dissipation of the heat produced by the light-emitting diodes 16.

A transparent window 132 of concave shape is formed in the housing 210 to enable the light rays reflected by the reflection device 125 to emerge from the housing 210.

The use of the heat sink 18 consisting of a base plate 50, on the one hand, and a strip 52 improves the heat dissipation, so that the lenses 25 may be placed closer to the LEDs 16. The overall dimensions of the image generator are therefore reduced. Thus, a gain of a few millimeters in the distance d1 separating the screen 12 from the heat sink 18 may result in a space saving of several centimeters in the distance d2 separating the image generator 10 from the bottom of the housing 210 of the head-up display 200 (HUD), because of the amplifying or magnifying effect of the various mirrors placed in the housing 210 of the head-up display 200.

The invention claimed is:
1. A head-up display, comprising:
a head-up display housing;
an image generation device; and
at least one reflecting mirror,
wherein the image generation device is held in the head-up display housing and comprises a liquid crystal screen and a backlighting device for the liquid crystal screen;
wherein the backlighting device comprises:
at least one light-emitting diode which emits light beams;
an optical system for shaping the light beams;
a light diffuser receiving the shaped light beams; and a heat sink made in at least two parts, comprising a base plate and at least one strip fastened to said base plate, the strip comprising at least one bend to form at least one cooling fin and at least one area that comes into thermal contact with said base plate, wherein the heat sink projects outside the head-up display housing, and wherein a distance between the at least one light-emitting diode and the optical system is less than 0.7 mm.

2. The head-up display as claimed in claim 1, wherein the strip has a plurality of bends and a plurality of areas in contact with the base plate.

3. The head-up display as claimed in claim 2, wherein the strip has a castellated shape.

4. The head-up display as claimed in claim 1, wherein a heat-conducting paste is interposed between the base plate and at least one contact area.

5. The head-up display as claimed in claim 1, wherein the strip is fastened to the base plate by one selected from a group consisting of: welding, screwing and crimping.

6. The head-up display as claimed in claim 1, wherein the strip and/or the base plate is made of aluminum.

7. The head-up display as claimed in claim 1, wherein the strip is placed on a lower face of the base plate, opposite an upper face of the base plate carrying the light-emitting diodes.

8. The head-up display as claimed in claim 1, wherein the base plate of the heat sink comprises, on a face opposite the face carrying the light-emitting diodes, grooves which house the fins.

9. The head-up display as claimed in claim 8, wherein the grooves have a curved or flat cross section, and the contact areas of the cooling fins are made in the fowl of a bent strip, the return bends being housed and fastened in grooves having a curved or flat cross section.

10. The head-up display as claimed in claim 1, wherein the strip is located in line with the light-emitting diodes.

11. The head-up display as claimed in claim 1, wherein the strip is offset relative to the location of the light-emitting diodes and is positioned on an extension of the base plate.

12. The head-up display as claimed in claim 11, wherein the extension of the base plate has a different orientation from the part of the base plate placed in line with the light-emitting diodes.

13. The head-up display as claimed in claim 12, wherein the base plate comprises a bend such that an extension of the base plate can have a different orientation from the part of the base plate placed in line with the light-emitting diodes.

14. The head-up display as claimed in claim 1, wherein the shaping optical system comprises a grid of lenses, each lens being placed facing a light-emitting diode and forming a collimator.

15. The head-up display as claimed in claim 1, further comprising:

a second housing that holds the at least one light-emitting diode and the liquid crystal screen, wherein the second housing has a polished surface that reflects light.

16. The head-up display as claimed in claim 1, further comprising a printed circuit board covered with a reflective film, except at locations of the at least one light-emitting diode.

17. The head-up display as claimed in claim 1, wherein the distance is between 0.3 mm and 0.7 mm.

18. The head-up display as claimed in claim 17, wherein the distance is 0.5 mm.

* * * * *